March 13, 1928.　　　　　　　　　　　　　　　　　1,662,050
S. E. ALLEN ET AL
SWINGSPOUT MEASURE
Filed Jan. 10, 1927
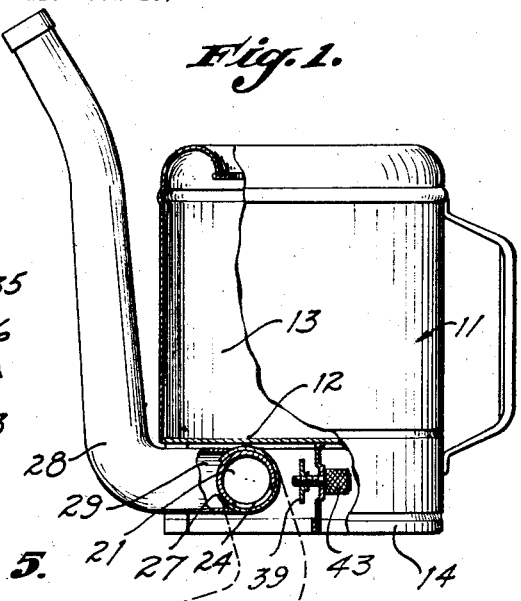
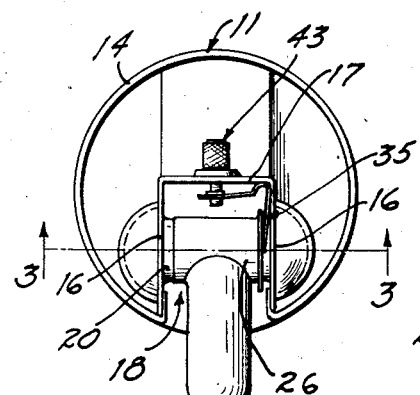
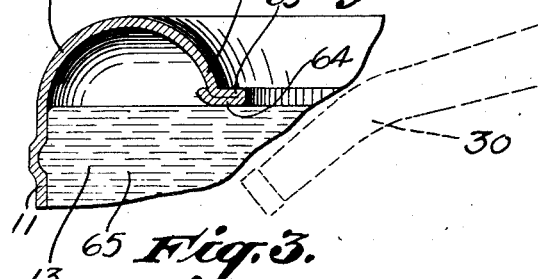
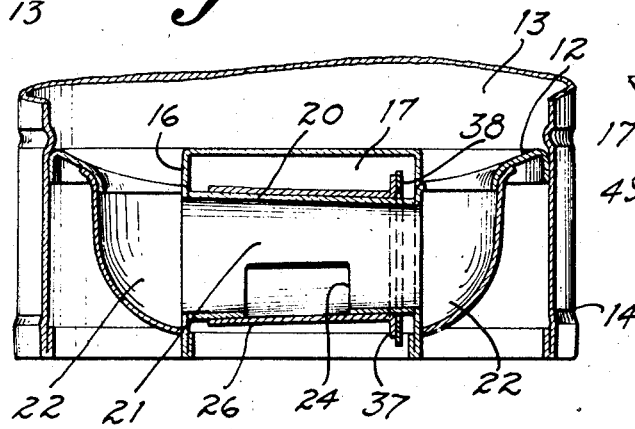
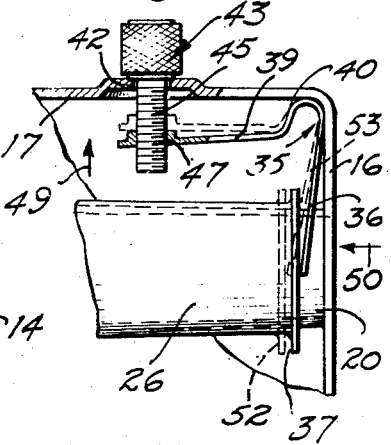
INVENTORS:
SCOTT E. ALLEN
OZRO N. WISWELL
BY Fad W Lewis
ATTORNEY.

Patented Mar. 13, 1928.

1,662,050

UNITED STATES PATENT OFFICE.

SCOTT E. ALLEN AND OZRO N. WISWELL, OF LOS ANGELES, CALIFORNIA, ASSIGNORS TO SWINGSPOUT MEASURE CO., OF LOS ANGELES, CALIFORNIA, A CORPORATION OF CALIFORNIA.

SWING-SPOUT MEASURE.

Application filed January 10, 1927. Serial No. 160,112.

This invention relates to swingspout measures and particularly to a swingspout measure having a self-adjusting valve.

Swingspout measures of the nature of this invention are used in oil stations for filling crank cases of automobiles with oil. Such swingspout measures consist of a container and a swingable spout connected to the lower end thereof. The swingable spout may be moved from an upright position into a pouring position. When the spout is moved into pouring position a valve is opened which permits the oil to flow from the container, through the spout, and into the crank case or other receptacle to be filled. After a swingspout measure has been in use for some time the parts of the valve begin to wear and the oil will leak from the receptacle.

It is an object of this invention to provide a valve for a swingspout measure in which the parts are resiliently held in nonleaking relation.

Another object of the invention is to provide a valve of this nature which may be adjusted to compensate for any wear between the engaging parts thereof.

One of the disadvantages of the swingspout measures as previously made, is that in filling the measure it is difficult to determine when the oil has reached the proper level in the measure so that the measure will contain the exact quantity of oil which it is designed to hold. This has been difficult because the arched rim provided around the upper edge of the walls of the measure has an inner edge which projects downward. Thus, as the oil rises in the measure toward the top thereof, it is difficult to see when the inner edge of the arched rim sinks into the surface of the oil.

It is an additional object of our invention therefore to provide a swingspout measure in which the arrival of the oil at a certain level in the measure when the latter is being filled can be easily detected by the operator.

Other objects and advantages of the invention will be brought out in the following description of the invention.

Referring to the drawing in which a preferred form of this invention is illustrated:

Fig. 1 is a vertical section, partly sectioned, showing a swingspout measure in which the invention is incorporated.

Fig. 2 is a bottom plan view of Fig. 1.

Fig. 3 is a cross-section taken on the line 3—3 of Fig. 2.

Fig. 4 is an enlarged fragmentary section showing the means of the invention for compensating for the wear of the moving parts.

Fig. 5 indicates the improved level indicating feature of our invention.

Referring in detail to the drawing the numeral 11 represents a cylindrical shell in which a bottom 12 is secured in order to provide an oil chamber 13. The bottom 12 is placed above the lower end of the shell 11 so that the lower end of the shell forms a rim denoted by the numeral 14. Extending from the bottom 12 to the lower edge of the rim 14 are vertical side walls 16 and a back wall 17 which cooperate to provide a pocket 18. The rim 14 has an opening adjacent to the pocket 18, and the pocket 18 is therefore connected to the side of the container.

Connected to the side walls 16 is a frustoconical bearing 20 which is mounted on a horizontal axis. The frusto-conical bearing 20 has an opening 21 formed therethrough which is connected by passages 22 to the bottom of the oil chamber 13. A port 24 is formed in the frusto-conical bearing 20, which port connects to the opening 21 and to the exterior of the frusto-conical bearing. The frusto-conical bearing 20 extends across the pocket 18 as shown. Surrounding the frusto-conical bearing 20 in the pocket 18 is a frusto-conical sleeve 26 which is adapted to seat on the frusto-conical bearing 20. The frusto-conical sleeve 26 has an opening 27 which is arranged so that it may be moved into alignment with the port 24 of the frusto-conical bearing 20. Connected to the frusto-conical sleeve 26 is a spout 28 having a passage 29 which is connected to the opening 27. The spout 28 is formed as shown in Fig. 1. When it rests in the position shown by full lines, the opening 27 is disaligned with the port 24, and therefore the valve comprising the frusto-conical bearing 20 and the frusto-conical sleeve 26 is closed and oil cannot flow from the oil chamber 13. When the spout is moved into the position indicated by dotted lines 30 the opening 27 is aligned with the port 24 and the valve is opened so that oil may flow from the oil chamber 13.

For the purpose of retaining the frusto-conical sleeve 26 in a proper seating relation to the frusto-conical bearing 20, we provide a seating member indicated by the numeral 35. Referring particularly to Fig. 4, the seating member 35 is made of a spring material and has a primary or engaging leg 36 which is adapted to engage a flange 37 formed on the small end of the frusto-conical sleeve 26. The outer end of the engaging leg 36 is provided with forks 38 so as to extend around one end of the frusto-conical bearing 20. The seating member 35 also has a secondary or pressure adjusting leg 39 which extends substantially at right angles to the engaging leg 36. The end of the pressure adjusting leg 39 which connects to the engaging leg 36 is provided with a crooked portion 40 so that the juncture of the two legs 36 and 39 may engage the corner provided by one of the vertical walls 16 and the vertical wall 17, thus serving as a fulcrum for the seating member 35. Extended through an opening 42 formed in the back wall 17 is an adjustment member in the form of a screw 43. The screw 43 has a head 44 and a threaded pin 45 which is screwed through a threaded opening 47 formed in the free end of the pressure adjusting leg 39 of the seating member 35.

In order to cause the engaging leg 36 to press against the frusto-conical sleeve 26 and resiliently retain it in proper seating relation with the frusto-conical bearing 20, the screw 43 is rotated so as to move the pressure adjusting leg 39 in the direction indicated by the arrow 49 in Fig. 4. This moves the seating member 35 on its fulcrum and tends to move the engaging leg 36 in the direction indicated by the arrow 50 in Fig. 4. It will be seen that this results in a pressure of the forks 38 against the flange 37 of the frusto-conical sleeve 26 in a direction to cause it to seat. It will be seen that by operating the screw 43, various pressures may be applied by the seating member 35 to the frusto-conical sleeve 26, thus causing different seating pressures of the frusto-conical seat on the frusto-conical bearing 20. If a very thin fluid is to be placed in the oil chamber 13 a tight seating of the frusto-conical sleeve is desirable; however, if a heavy fluid is placed in the oil chamber 13 a very tight seating of the valve parts is not required. As the frusto-conical bearing 20 and the frusto-conical sleeve 26 wear, the sleeve may move as indicated by dotted lines 52 in Fig. 4. This movement may be compensated for by moving the seating member 35 into the position indicated by dotted lines 53 in Fig. 4, this being accomplished by operating the adjustment screw 43.

The important part of the invention inheres in the seating member 35 and the screw 43 for adjusting its position.

The novel level indicating feature of our invention, as shown in Fig. 5, is constructed as follows:

An arched rim 60 is formed upon the upper edge of the walls of the shell 11 and projects inward from these walls. The inner edge 62 of the rim 60 is bent radially inward to form a flange 63 which, for the purposes of strengthening this flange, may be bent outward upon itself as at 64. As the measure is filled, the oil 65 rises until it is on the same level as the flange 63, as shown in Fig. 5. During the filling operation, the eye of the operator is kept upon the flange 63 and as the oil arrives at the level of this flange, as shown in Fig. 5, the operator shuts off the valve supplying oil to the measure. Thus, the amount of oil placed in the measure can be easily and accurately judged by the operator and the present irregularity in the quantity served in these measures will be overcome.

We claim as our invention:

1. An oil measuring vessel comprising: walls forming a chamber having a filling opening at the upper end; an arched rim extending inward from the upper edge of said walls; and a horizontal flange provided upon the inner edge of said rim and projecting substantially radially inward therefrom to serve as a level indicator.

2. An oil measuring vessel comprising: walls forming a chamber having a filling opening at the upper end; an arched rim extending inward from the upper edge of said walls; and a horizontal flange provided upon the inner edge of said rim and projecting substantially radially inward therefrom to serve as a level indicator, said flange being continuous about said opening.

3. A swingspout measure comprising: a vessel having a containing chamber of a desired size, there being an opening from the bottom portion of said chamber; a frusto-conical axle on said vessel having a peripheral opening and an internal passage connecting said openings; a sleeve fitting said axle and rotatable thereon; a spout provided on said sleeve to connect with said axle opening; a flexible bell crank member fulcruming on said measure and having one arm engaging said sleeve to urge same snugly onto said axle, the other arm of said bell crank member lying substantially parallel with said axle; and means for adjustably positioning said other bell crank arm to control the pressure of said bell crank against said sleeve.

4. A swingspout measure comprising: a vessel having a containing chamber of a desired size; a U-shaped member provided on said vessel and having a base and two legs extending from opposite ends of said base, there being an opening in one of said legs connecting with the bottom portion of said chamber; a frusto-conical axle mounted between said legs and having a passage communicating between said leg opening, and another opening peripherally formed in said axle; a sleeve fitting said axle and rotatable thereon; a spout provided on said sleeve to connect with the peripheral opening of said axle; a flexible bell crank fulcruming on said U-shaped member, one arm of said bell crank engaging said sleeve to urge this onto said axle, a second arm of said bell crank extending substantially parallel with said base; and an adjusting screw provided on said base to engage said second bell crank arm to vary the pressure of the first mentioned arm against said sleeve.

5. A swingspout measure comprising: a vessel having a containing chamber of a desired size; a U-shaped member provided on said vessel and having a base and two legs extending from opposite ends of said base, there being an opening in one of said legs connecting with the bottom portion of said chamber; a frusto-conical axle mounted between said legs and having a passage communicating between said leg opening, and another opening peripherally formed in said axle; a sleeve fitting said axle and rotatable thereon; a spout provided on said sleeve to connect with the peripheral opening of said axle; a flexible bell crank fulcruming on one of the legs of said U-shaped member, one arm of said bell crank engaging said sleeve to urge this onto said axle, a second arm of said bell crank extending substantially parallel with said base; and an adjusting screw provided on said base to engage said second bell crank arm to vary the pressure of the first mentioned arm against said sleeve.

In testimony whereof, we have hereunto set our hands at Los Angeles, California, this 4th day of January, 1927.

SCOTT E. ALLEN.
OZRO N. WISWELL.